UNITED STATES PATENT OFFICE.

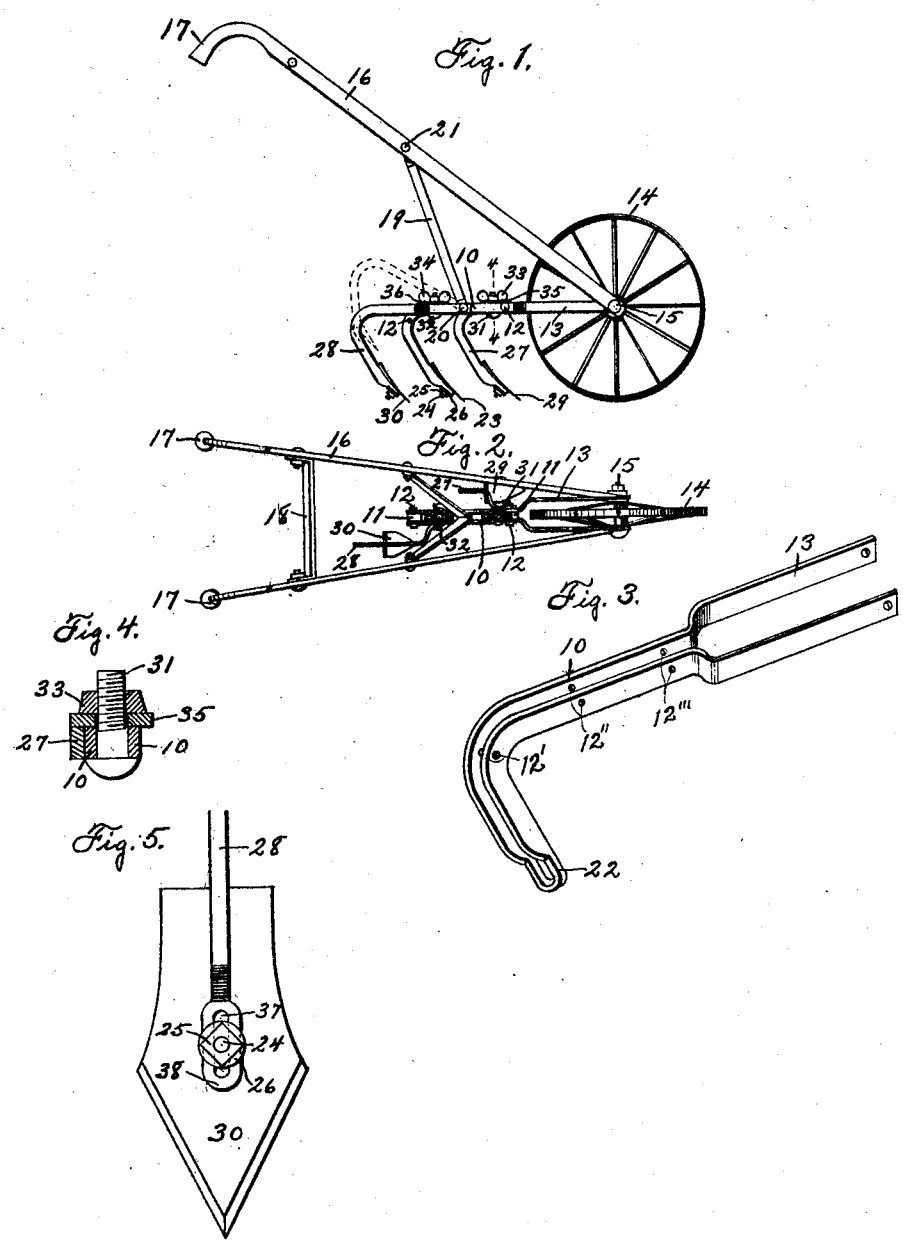

THOMAS E. STANLEY, OF EARLHAM, IOWA.

HAND CULTIVATOR.

1,406,772.  Specification of Letters Patent.  Patented Feb. 14, 1922.

Application filed March 10, 1919. Serial No. 281,871.

*To all whom it may concern:*

Be it known that I, THOMAS E. STANLEY, a citizen of the United States of America, and resident of Earlham, Madison County, Iowa, have invented a new and useful Hand Cultivator, of which the following is a specification.

The object of this invention is to provide an improved construction for a garden cultivator or plow adapted for hand use.

A further object of this invention is to provide an improved hand cultivator having a plurality of cultivating devices, all but one of which are adapted independently to be placed in non-operative position.

A further object of this invention is to provide an improved construction for a cultivator beam for a garden plow.

A further object of this invention is to provide improved means for mounting auxiliary beams on and relative to a main cultivator beam, such means being susceptible of use in holding said auxiliary beams in either operative or non-operative position.

My invention consists in the construction, arrangement and combination of elements hereinafter set forth, pointed out in my claims and illustrated by the accompanying drawing, in which—

Figure 1 is a side elevation of my improved hand cultivator, dotted lines indicating non-operative position of one of the auxiliary beams and cultivating devices. Figure 2 is a plan of the device. Figure 3 is a perspective of the main cultivator beam detached. Figure 4 is a detail section, on an enlarged scale, on the indicated line 4—4 of Figure 1. Figure 5 is a rear elevation of a portion of one of the auxiliary beams and a shovel secured thereto, on an enlarged scale.

In the construction of the device as shown the numeral 10 designates generally a main cultivator beam, which is composed of parallel members spaced apart by spacing blocks 11, through which connecting bolts 12 are mounted. The main beam 10 is formed with spaced pairs of bolt holes 12′, 12″ and 12‴ (Fig. 3). The connecting bolts 12, of which two are provided, are mounted respectively in the holes 12′ and 12‴ and also extend through registering holes in the spacing blocks 11. The forward end of the beam 10 is expanded to form a fork 13 in which a wheel 14 is mounted for rotation on a bolt 15. Handles 16 are also fixed at their forward ends to the bolt 15, outside of the fork 13, and diverge upwardly and rearwardly and are provided with grips 17 on their opposite ends, upper portions of said handles being connected by a cross bar 18. A brace 19 is composed of two members having their lower ends in contiguity and secured between the members of the beam 10 by means of a bolt 20 mounted in the holes 12″, said bolt also extending through registering holes in said lower ends of the brace members; and said members diverge upwardly and are adjustably secured by a bolt 21 to middle portions of the handles 16. The rear end of the main cultivator beam 10 is bent or curved downwardly and slightly forwardly and the lower portion of the shank so formed is reduced in width at 22 to provide means for attaching a cultivating device, such as a shovel 23 having a bolt or stud 24 extending rearwardly therefrom and through the reduced portion 22, between the parallel members of the beam and secured by a nut 25 and washer 26, the rear face of the reduced portion being parallel with the front face and affording a seat for said washer.

Auxiliary shovel beams 27, 28 are provided and are of goose-neck form, that is provided with straight forward portions and downwardly and forwardly bent rear portions forming shanks. The auxiliary shovel beams 27, 28 are mounted on opposite sides of the main beam 10 and are oppositely offset, intermediate of their ends, away from said beam. The forward or supporting portions of the auxiliary beams lie close to the outer faces of the members of the beam 10 and are pivoted at their forward ends, respectively, on the left end portion of the foremost bolt 12 and the right end portion of the bolt 20. Shovels 29, 30 are secured to the rear or lower ends of the auxiliary beams 27, 28, in a manner similar to the shovel 23 on the main beam. The shovels are so arranged, because of the opposite off-setting of the auxiliary beams 27, 28 and the spacing of their respective pivots on the bolts 12 and 20 in the holes 12‴ and 12″ in the main beam, that the shovel 29 of the auxiliary beam 27 is in advance and to the left of the shovel 23 on the main beam and the shovel 30 of the auxiliary beam 28 is to the rear and right of said shovel 23, said shovels preferably being equally spaced longitudinally and laterally, the central or main shovel 23 being in the line of advance of the supporting wheel 14.

Bolts 31, 32 are mounted vertically through the double beam 10, with their heads arranged downwardly, and wing-nuts 33, 34 are mounted on the upper ends of said bolts, while washers 35, 36 are mounted on the bolts below the nuts and overlie the adjacent portions of the auxiliary beams 27, 28 and prevent upward movement of said beams, and the cultivating devices thereon, in use.

At times it is desirable to use one shovel only, the central one 23, for cultivating or marking out furrows for planting. In that event the auxiliary beams 27, 28 and their shovels may be moved to non-operative position by loosening the wing-nuts 33, 34, sliding the bolts 31, 32 longitudinally in the double beam 10 until they clear the auxiliary beams, or the close-lying portions thereof rearward of their respective pivots 12, then moving said auxiliary beams through arcs upwardly to elevate the shovels 29, 30, as indicated by dotted lines in Figure 1. The auxiliary beams 27, 28 are held in elevated positions, either or both of them independently, by moving the bolts 31, 32 and washers 35, 36 beneath them, and the washers and bolts may be adjusted longitudinally of the beam 10 to determine the degree of elevation of said beams 27, 28.

The lower ends of the shanks of the auxiliary beams 27, 28 preferably are reduced in width and expanded laterally, as shown in Figure 5, and formed with longitudinal slots 37 to receive the studs or bolts 25 of the shovels 29, 30, thus conforming the connecting means to that of the double beam 10, the reduced and expanded portions, indicated by the numeral 38, forming a seat for the washers 26 of said connecting means.

I claim as my invention—

1. In a hand cultivator, the combination with a main beam and auxiliary beams pivoted thereto on spaced horizontal axes, of spaced bolts mounted for sliding adjustment longitudinally of the main beam and extending transversely thereof substantially at right angles to the pivots, and stop devices carried by said bolts and adapted to engage the upper margins of the auxiliary beams when said beams are in horizontal positions and also adapted to engage the lower margins of and adjust said beams in their inoperative positions, whereby said auxiliary beams are held, relative to the main beam, in selected positions.

2. In a hand cultivator, the combination with a main beam formed with a vertical slot and auxiliary beams pivoted to the main beam and adapted for arcuate adjustment thereon on horizontal axes, said auxiliary beams being each offset between its ends so that the major portion of its length is spaced from and lies in a plane parallel with the main beam, of bolts mounted through and adapted for longitudinal adjustment in said vertical slot adjacent the offsets of the auxiliary beams, and a stop device carried by each bolt and adapted to extend across the path of arcuate movement of an auxiliary beam and also adapted to engage alternately opposite margins of said auxiliary beam, whereby either auxiliary beam may be held in any position in which it is placed manually.

3. In a hand cultivator, the combination with a main beam formed with a vertical slot and auxiliary beams arranged on opposite sides of and pivoted to the main beam by spaced horizontal pivots, said auxiliary beams being arranged for selective arcuate movement on said horizontal pivots and offset between their ends outwardly from the main beam, of separate bolts mounted through and adapted for adjustment longitudinally of said vertical slot and a stop device on each bolt spanning said slot and projecting laterally across the paths of arcuate movement of the auxiliary beams, whereby said stop devices may be moved into and out of engagement with opposite margins of said auxiliary beams and hold said beams in any position into which they may be adjusted manually.

4. In a cultivator the combination of a main beam formed with a vertical slot, an auxiliary beam pivoted thereto on a horizontal axis and offset laterally therefrom, a part of the auxiliary beam lying parallel and in contact with the main beam, a bolt mounted in said vertical slot and adjustable longitudinally of the main beam, and a stop device carried by the bolt above the main beam and adapted to engage either the upper or lower margin of the auxiliary beam and limit arcuate movement of the auxiliary beam.

Signed at Earlham, in the county of Madison and State of Iowa, this 21st day of August, 1918.

THOMAS E. STANLEY.